United States Patent Office 2,706,897
Patented Apr. 26, 1955

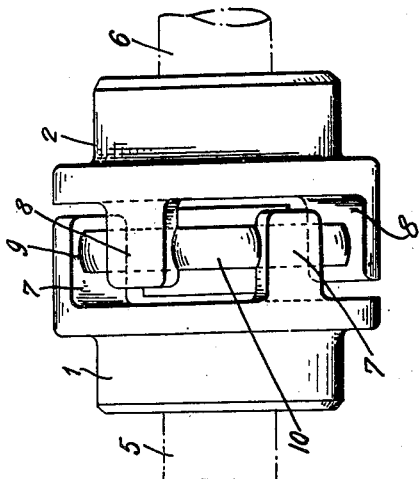
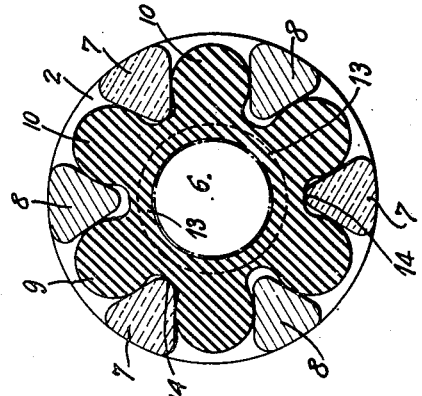
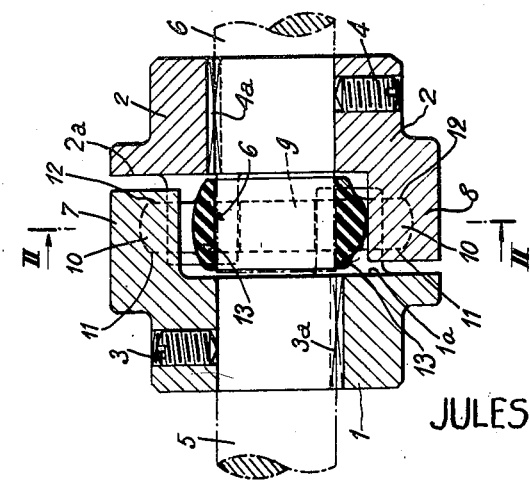

2,706,897

ELASTIC COUPLING DEVICE FOR CONNECTING TWO SHAFTS IN LINE WITH EACH OTHER

Jules Alfred Holoye, Liege, Belgium

Application April 17, 1953, Serial No. 349,528

6 Claims. (Cl. 64—14)

The object of the present invention is an elastic coupling device intended for connecting two shafts placed in line with each other.

Most couplings of this type use more or less delicate elements which are difficult to manufacture, which require a high precision and a perfect aligning of the shafts, on account of their shapes and lack of elasticity. In practice, it is difficult to obtain and preserve this aligning, in service, with a sufficient accuracy; there result vibrations, jammings, axial thrusts and other stresses in the coupling, which cause a heating of the bearings, shafts, and, consequently, their abnormal wear or their seizing, especially in the case of high linear speeds.

Elastic couplings have already been proposed, consisting of two plates offering housings inside which a cross shaped part is inserted, the branches of which fit into the housings provided in the two plates associated with the shafts to be connected. In these couplings, however, the amount of elastic material interposed between the plates is relatively small, and, particularly, entirely enclosed in the housings of said plates. Due to this fact, the space allowed for the compression of the elastic element is very small which means, in service, a very low elasticity, i. e. the relative angular displacement of the plates with respect to each other is very small, generally less than 3°; in addition, flexibility, that is the possibility for the coupling, of allowing a certain off-centering, or lack of alignment of the shafts is practically zero.

It has been attempted to obviate these drawbacks by giving the cross pieces a substantially elliptical section, but this has the effect, without any very great increase either in elasticity or flexibility, of making the assembling of the coupling very difficult, since a considerable stress must be exerted for introducing the elastic element between the plates and, in addition, if the interval between the plates is not strictly that provided by the builder or if, during service, the shafts have a slight axial displacement, an objectionable lateral thrust necessarily occurs.

The present invention obviates these drawbacks by creating a device constituted by a spacer of elastic material, comprising balls, segmented or not, connected with one another continuously, said balls being interposed between the lugs, alternating with one another, of two sleeves, associated respectively with the ends of two shafts placed in line with each other.

According to another feature of the invention, a circular rim, located at the base of the balls, on both sides of the spacer and integral therewith, makes it possible to locate the spacer between the two plates.

The spacer further offers, at its center, a hole allowing the passage for the shafts of the coupled devices while allowing a maximum reduction of the space left between the two shafts.

Further, the thickness of the ring connecting the balls of the spacer is increased at some points so as to center the spacer on the inside of the lugs of one of the sleeves.

This elastic coupling device makes it possible to obtain a simple compression of the balls of elastic material between the opposite faces of the lugs belonging to one and the other sleeves during operation of the coupling device. This simple compression crushes the balls to a maximum, the latter having all the necessary space for deformation, while making it possible to obtain the best efficiency of their elasticity and the maximum angular displacement of the two sleeves with respect to each other. In addition, this elastic coupling device avoids, when starting, stops and load variations during operation, the shocks and oscillations which occurred until now in coupling of this kind. Flexibility is positively improved and a slight axial displacement of the shafts is allowed.

Various other features of the invention will also appear from the following detailed description:

A form of embodiment of the object of the invention is represented, by way of example, in the appended drawing:

Fig. 1 is a sectional elevation of the elastic coupling device mounted between two shafts placed in line with each other.

Fig. 2 is a section along line II—II of Fig. 1.

Fig. 3 is a side elevation of the coupling mounted between two shafts.

The coupling device is constituted by two similar sleeves 1, 2 secured respectively by screws 3, 4 or keys 3a, 4a, on the ends of the two shafts 5, 6.

The sleeves 1, 2 offer, on their face 1a and 2a, lugs 7 and 8 with a substantially triangular section.

A spacer 9 is placed between the lugs 7 and 8 of the sleeves 1 and 2. This spacer which assumes the shape of a six point star, is cut out at its central portion. Each branch of the star consists of a ball 10, truncated on each side for forming two plane surfaces 11, 12. On each side of the spacer and located between the central cut-out and the bases of the balls, is a rim 13. The thickness of the ring connecting the balls of the spacer is reinforced at 14, the spacer thus bearing on the base of the lugs 7. The spacer is placed between the lugs 7 and 8, alternating with one another, of the sleeves 1 and 2 so that the spherical portions of the ball segments 10 bear alternately on the opposite plane faces of the lugs 7 and 8.

The mounting of the elastic coupling according to the invention is very easy; it is sufficient, first, to place one of the sleeves, for instance the sleeve 1, on the end of a shaft, shaft 5 for instance. When the sleeve 1 is keyed on the shaft or locked by the screw 3, the spacer 9 is placed between the lugs 7 of the sleeve 1, making sure that the excess thicknesses 14 of the ring for connecting the balls to bear on the base of the lugs 7. The sleeve 2 is mounted on the end of the shaft 6, the lugs of which, 8, come and fit without any difficulty in the free spaces between the balls of the spacer 9, as shown in Figure 2. This mounting is effected without any stress, any crushing either of the balls 10 or of the connecting ring or of the rims. This elastic coupling device makes it possible to obtain, under load, an angular offset of the two shafts to be connected, of a very high value since this offset may reach 12°. The shape of the spacer 9 as well as the shapes of the sleeves 1 and 2 give the assembly a great elasticity, by allowing the already mentioned angular offset as well as the possibility of a slight off-centering or lack of alignment of the shafts, and even a slight axial displacement. Further, any axial thrust is impossible, due to the fact that the spacer 9 is perfectly free within its housing and perfectly located. In service, one branch out of two of the spacer 9 is flattened between one lug of the sleeve associated with the driving shaft and one lug associated with the sleeve of the driven shaft. On the other hand, the other branches of the spacer play freely between the lugs of the sleeves. A positive driving is thus obtained of one sleeve by the other sleeve. As soon as the driving ceases, the branches move the lugs apart under the action of their elasticity and resume the position shown in Fig. 2.

In the case of a reversible coupling, half of the branches, of the spacer work in one direction while the other half work in the other direction.

This elastic coupling device is of a very low cost; it can be used particularly for the transmission of low torques.

In some cases a cover may be placed above the central portion of the coupling device for protecting the spacer, which, in general, is made of suitably treated rubber, but which may also be made of any other desirable material.

Various modifications may be made to the form of embodiment of the invention, given by way of example, within the scope of the invention, in particular, the number of branches of the spacer 9 may vary according to the importance of the torque to be transmitted, and of the

I claim:
1. A coupling device for connecting substantially aligned shafts comprising a pair of sleeves secured onto the end portions of said shafts having circumferentially spaced lugs extending axially from their adjacent end faces into alternatively overlapping relationship with one another, a spacer of elastic material interposed between said faces, said spacer comprising a cylindrical hub forced onto at least one of said shafts and branches arranged star-wise, each branch fitting between opposing faces of adjacent lugs, said opposing faces of adjacent lugs being substantially flat and said spacer branches having substantially circular faces in contact with said flat lug faces whereby recesses are provided between said lug faces and said spacer faces to permit the necessary deformation of said spacer branches.

2. A coupling device according to claim 1 wherein said cylindrical hub is axially thicker than the thickness of said branches and extends outwardly therefrom on each side of said branches.

3. A coupling device according to claim 1, wherein said hub is radially thicker between alternate branches whereby said hub is in contact with the base of the lugs on one of the sleeves and wherein said hub is radially thinner between alternate branches whereby said hub is not in contact with the base of the lugs on the other of said sleeves and a recess is provided therebetween permitting shifting of said other sleeve with respect to said first sleeve.

4. A coupling device for connecting substantially aligned shafts comprising a pair of sleeves, the first secured to the end of the first shaft and the second secured on the second shaft allowing the free end thereof to protrude, circumferentially spaced lugs extending axially from adjacent end faces of said sleeves into alternatively overlapping relationship with one another, a spacer of elastic material interposed between said faces, said spacer being forced onto said free end of the second shaft, said spacer comprising a cylindrical hub and branches arranged star-wise, each branch fitting between opposing faces of adjacent lugs, said opposing faces of adjacent lugs being substantially flat and said spacer branches having substantially circular faces in contact with said flat lug faces whereby recesses are provided between said lug faces and said spacer faces to permit the necessary deformation of said spacer branches.

5. A coupling device according to claim 4, wherein said spacer branches have flat side faces and said cylindrical hub is axially thicker than the thickness of said branches and extends outwardly from each said side face.

6. A coupling device according to claim 4, wherein said hub is radially thicker between alternate branches whereby said hub is in contact with the base of the lugs on one of the sleeves and wherein said hub is radially thinner between alternate branches whereby said hub is not in contact with the base of the lugs on the other of said sleeves and a recess is provided therebtween permitting shifting of said other sleeve with respect to said first sleeve.

References Cited in the file of this patent

UNITED STATES PATENTS

| | | |
|---|---|---|
| 2,025,828 | Ricefield | Dec. 31, 1935 |
| 2,616,273 | Pringle | Nov. 4, 1952 |